United States Patent
Chen et al.

(10) Patent No.: US 12,423,948 B2
(45) Date of Patent: Sep. 23, 2025

(54) SYSTEMS AND METHODS FOR PREDICTING LONG-TAIL COLORS IN IMAGES

(71) Applicant: ADOBE INC., San Jose, CA (US)

(72) Inventors: Qiuyu Chen, San Jose, CA (US); Quan Hung Tran, San Jose, CA (US); Kushal Kafle, Sunnyvale, CA (US); Trung Huu Bui, San Jose, CA (US); Franck Dernoncourt, Seattle, WA (US); Walter W. Chang, San Jose, CA (US)

(73) Assignee: ADOBE INC., San Jose, IA (US)

( * ) Notice: Subject to any disclaimer, the term of this patent is extended or adjusted under 35 U.S.C. 154(b) by 410 days.

(21) Appl. No.: 17/814,921

(22) Filed: Jul. 26, 2022

(65) Prior Publication Data

US 2024/0037906 A1 Feb. 1, 2024

(51) Int. Cl.
*G06V 10/764* (2022.01)
*G06V 10/56* (2022.01)
*G06V 10/774* (2022.01)

(52) U.S. Cl.
CPC ........... *G06V 10/764* (2022.01); *G06V 10/56* (2022.01); *G06V 10/774* (2022.01); *G06V 2201/10* (2022.01)

(58) Field of Classification Search
None
See application file for complete search history.

(56) References Cited

U.S. PATENT DOCUMENTS

| | | | |
|---|---|---|---|
| 2018/0025002 A1* | 1/2018 | Dorner | G06T 7/90 382/165 |
| 2021/0326576 A1* | 10/2021 | Liang | G06V 10/82 |
| 2022/0138483 A1* | 5/2022 | Zhang | G06V 20/63 382/176 |

(Continued)

FOREIGN PATENT DOCUMENTS

| | | | | |
|---|---|---|---|---|
| CN | 105933762 | | 9/2016 | |
| CN | 105933762 A | * | 9/2016 | H05B 47/10 |

(Continued)

OTHER PUBLICATIONS

Chun et al. ("A Novel Clothing Attribute Representation Network-Based Self-Attention Mechanism"—IEEE—Nov. 2020, pp. 1-8) (Year: 2020).*

(Continued)

*Primary Examiner* — Akwasi M Sarpong
*Assistant Examiner* — Pawan Dhingra
(74) *Attorney, Agent, or Firm* — F. CHAU & ASSOCIATES, LLC

(57) ABSTRACT

Systems and methods for color prediction are described. Embodiments of the present disclosure receive an image that includes an object including a color, generate a color vector based on the image using a color classification network, where the color vector includes a color value corresponding to each of a set of colors, generate a bias vector by comparing the color vector to teach of a set of center vectors, where each of the set of center vectors corresponds to a color of the set of colors, and generate an unbiased color vector based on the color vector and the bias vector, where the unbiased color vector indicates the color of the object.

17 Claims, 11 Drawing Sheets

(56) References Cited

U.S. PATENT DOCUMENTS

2022/0245424 A1* 8/2022 Goyal ................ G06V 10/82

FOREIGN PATENT DOCUMENTS

| KR | 10-2018-0038937 | 4/2018 |
|---|---|---|
| WO | 2005024662 | 3/2005 |

OTHER PUBLICATIONS

Tang et al. ("Unbiased Scene Graph Generation from Biased Training"—arXiv—Mar. 2020, pp. 1-16 (Year: 2020).*
Office Action dated Oct. 18, 2023 for related U.S. Appl. No. 17/333,583.
Chun, et al., "A Novel Clothing Attribute Representation Network-Based Self-Attention Mechanism", IEEE Access, Nov. 17, 2020, pp. 1-8.
Bello, et al., "Attention Augmented Convolutional Networks", arXiv preprint arXiv:1904.09925v4 [cs.CV] Sep. 28, 2019, pp. 1-13.
Office Action dated Mar. 24, 2023 for related U.S. Appl. No. 17/333,583.
Hu, et al., "Relation Networks for Object Detection", In Proceedings of the IEEE Conference on Computer Vision and Pattern Recognition, pp. 3588-3597, 2018.
Hwang, et al., "Sharing Features Between Objects and Their Attributes", In CVPR 2011, pp. 1761-1768, 2011, IEEE.
Krishna, et al., "Visual Genome: Connecting Language and Vision Using Crowdsourced Dense Image Annotations", International Journal of Computer Vision, 123(1):32-73, 2017.
Lampert, et al. "Learning to Detect Unseen Object Classes by Between-Class Attribute Transfer", In 2009 IEEE Conference on Computer Vision and Pattern Recognition, pp. 951-958, IEEE.
Li, et al., "Symmetry and Group in Attribute-Object Compositions", In Proceedings of the IEEE/CVF Conference on Computer Vision and Pattern Recognition, pp. 11316-11325, 2020.
Lin, et al., "Improving Person Re-identification by Attribute and Identity Learning", Pattern Recognition, 95:151-161, arXiv:1703.07220v3 [cs.CV] Jun. 9, 2019.
Liu, et al., "Deep Learning Face Attributes in the Wild", In Proceedings of the IEEE International Conference on Computer Vision (ICCV), 2015, pp. 3730-3738.
Lu, et al., "Vilbert: Pretraining Task-Agnostic Visiolinguistic Representations for Vision-and-Language Tasks", In Advances in Neural Information Processing Systems, pp. 13-23, arXiv:1908.02265v1 [cs.CV] Aug. 6, 2019.
Lu, et al., "12-in-1: Multi-Task Vision and Language Representation Learning", In Proceedings of the IEEE/CVF Conference on Computer Vision and Pattern Recognition, pp. 10437-10446, 2020.
Mahajan, et al., "A Joint Learning Framework for Attribute Models and Object Descriptions", In 2011 International Conference on Computer Vision, pp. 1227-1234, IEEE.
Chen, "Representation Learning of Image Recognition: Diversity, Aspect Ratio, Invariance, and Composition", Available from Dissertations & Theses @ University of North Carolina Charlotte; ProQuest Dissertations & Theses Global. (2528837685). https://librarylink.uncc.edu/login?url=https://www-proquest-com.librarylink.uncc.edu/dissertations-theses/representation-learning-image-recognition/docview/2528837685/se-2?accountid=14605, 170 pages.
Miller, et al., "Key-Value Memory Networks for Directly Reading Documents", In Proceedings of the 2016 Conference on Empirical Methods in Natural Language Processing, EMNLP 2016, Austin, Texas, USA, Nov. 1-4, 2016, pp. 1400-1409, The Association for Computational Linguistics, arXiv:1606.03126v2 [cs.CL] Oct. 10, 2016.
Misra, et al., "From Red Wine to Red Tomato: Composition with Context", In Proceedings of the IEEE Conference on Computer Vision and Pattern Recognition, pp. 1792-1801, 2017.
Nan, et al., "Recognizing Unseen Attribute-Object Pair with Generative Model", In Proceedings of the AAAI Conference on Artificial Intelligence, vol. 33, pp. 8811-8818, 2019.
Oh, et al., "Video Object Segmentation using Space-Time Memory Networks", In Proceedings of the IEEE International Conference on Computer Vision, pp. 9226-9235, 2019.
Patterson, et al., "COCO Attributes: Attributes for People, Animals, and Objects", In European Conference on Computer Vision, pp. 85-100, Springer, 2016.
Purushwalkam, et al., "Task-Driven Modular Networks for Zero-Shot Compositional Learning", In Proceedings of the IEEE International Conference on Computer Vision, pp. 3593-3602, 2019.
Ren, et al., "Faster R-CNN: Towards Real-Time Object Detection with Region Proposal Networks", IEEE transactions on pattern analysis and machine intelligence, 39(6):1137-1149, arXiv:1506.01497v3 [cs.CV] Jan. 6, 2016.
Soomro, et al., "UCF101: A Dataset of 101 Human Actions Classes From Videos in The Wild", Center for Research in Computer Vision, 2(11), 7 pages, arXiv:1212.0402v1 [cs.CV] Dec. 3, 2012.
Sukhbaatar, et al., "End-To-End Memory Networks", In Advances in neural information processing systems, pp. 2440-2448, arXiv:1503.08895v5 [cs.NE] Nov. 24, 2015.
Sun, et al., "VideoBERT: A Joint Model for Video and Language Representation Learning", In Proceedings of the IEEE International Conference on Computer Vision, pp. 7464-7473, 2019.
Bello, et al., "Attention Augmented Convolutional Networks" In Proceedings of the IEEE International Conference on Computer Vision, 2019, pp. 3286-3295.
Wang, et al., "Non-local Neural Networks", In Proceedings of the IEEE conference on computer vision and pattern recognition, pp. 7794-7803, 2018.
Xiao, et al., "Sun Database: Large-scale Scene Recognition from Abbey to Zoo", In 2010 IEEE computer society conference on computer vision and pattern recognition, pp. 3485-3492, IEEE.
Xie, et al., "Aggregated Residual Transformations for Deep Neural Networks", In Proceedings of the IEEE conference on computer vision and pattern recognition, pp. 1492-1500, 2017.
Yang, et al., "Learning Dynamic Memory Networks for Object Tracking", In Proceedings of the European Conference on Computer Vision (ECCV), pp. 152-167, 2018.
Zhao, et al., "Exploring Self-attention for Image Recognition", In Proceedings of the IEEE/CVF Conference on Computer Vision and Pattern Recognition, pp. 10076-10085, 2020.
Bourdev, et al., "Describing People: A Poselet-Based Approach to Attribute Classification", In 2011 International Conference on Computer Vision, pp. 1543-1550, IEEE.
Carion, et al., "End-to-End Object Detection with Transformers", In European Conference on Computer Vision (ECCV), 26 pages, arXiv:2005.12872v3 [cs.CV] May 28, 2020.
Chen, et al., "UNITER: UNiversal Image-TExt Representation Learning", In European Conference on Computer Vision, pp. 104-120, Springer, 26 pages, arXiv:1909.11740v3 [cs.CV] Jul. 17, 2020.
Park, et al., "Attend to You: Personalized Image Captioning with Context Sequence Memory Networks", In Proceedings of the IEEE conference on computer vision and pattern recognition, 2017, pp. 895-903.
Deng, et al., "Pedestrian Attribute Recognition at Far Distance", In Proceedings of the 22nd ACM international conference on Multimedia, pp. 789-792, 2014.
Foster, "Color constancy", Vision Research 51 (2011) 674-700.
He, et al., "Mask R-CNN", In Proceedings of the IEEE International Conference on Computer Vision, pp. 2961-2969, 2018.
Kang et al., "Decoupling Representation and Classifier for Long-Tailed Recognition", arXiv:1910.09217v2 [cs.CV] Feb. 19, 2020, 16 pages.
Tang et al., "Unbiased Scene Graph Generation from Biased Training", arXiv:2002.11949v3 [cs.CV] Mar. 11, 2020, 16 pages.

* cited by examiner

SYSTEMS AND METHODS FOR PREDICTING LONG-TAIL COLORS IN IMAGES

BACKGROUND

The following relates to color prediction. Color prediction is an image processing task that aims to predict the colors of an image or object within the image as they are perceived by a human. Human color perception can be surprisingly complex, for reasons ranging from color-shifts due to luminance changes to limitations in the human ability to maintain color constancy despite changes in lighting and reflections. Furthermore, different individuals can attribute different names to similarly perceived colors.

Long-tail color prediction is the prediction of tail colors, i.e. rare colors. Examples of such colors include "scarlet," "fuchsia", "coral", and others. These colors can be underrepresented in a training set compared to common or "head" colors. As a result, labeled datasets are often biased towards head colors and have fewer labels representing tail colors, even relative to the frequency that the tail colors appear. When prediction models are trained with biased datasets, this bias transfers to the model, resulting in decreased performance of the model for recognizing the tail colors. For example, many machine learning models are unable to predict tail colors in the top several guesses for a given image. Accordingly, there is a need for systems and methods for accurately predicting long-tail colors from images.

SUMMARY

The present disclosure describes systems and methods for long-tail color prediction. Embodiments of the present disclosure include a color prediction apparatus configured to predict colors present in an input image. The color prediction apparatus includes a color classification network configured to generate a color vector based on the input image. A debiasing component of the color prediction apparatus is configured to generate a bias vector based on bias in a classifier of the color prediction apparatus. Then, embodiments produce an unbiased color vector based on the color vector and the bias vector, where the unbiased color vector includes a color of an object in the input image.

Some embodiments of the debiasing component generate the bias vector based on bias in an encoder of the color prediction apparatus. Some embodiments generate the bias vector based on both the bias in the encoder and the bias in the classifier.

A method, apparatus, non-transitory computer readable medium, and system for color prediction are described. One or more aspects of the method, apparatus, non-transitory computer readable medium, and system include receiving an image that includes an object comprising a color; generating a color vector based on the image using a color classification network, wherein the color vector comprises a color value corresponding to each of a plurality of colors; generating a bias vector by comparing the color vector to each of a plurality of center vectors, wherein each of the plurality of center vectors corresponds to a color of the plurality of colors; and generating an unbiased color vector based on the color vector and the bias vector, wherein the unbiased color vector indicates the color of the object.

A method, apparatus, non-transitory computer readable medium, and system for color prediction are described. One or more aspects of the method, apparatus, non-transitory computer readable medium, and system include receiving training data comprising a plurality of training images and color data corresponding to a plurality of colors; training a color classification network based on the training data; generating a plurality of center vectors corresponding to the plurality of colors, respectively, using the color classification network; receiving an image that includes an object comprising a color; and generating an unbiased color vector based on the image and the plurality of center vectors using the color classification network.

An apparatus, system, and method for color prediction are described. One or more aspects of the apparatus, system, and method include a color classification network configured to generate a color vector based on an image, wherein the color vector comprises a color value corresponding to each of a plurality of colors and a debiasing component configured to generate a bias vector by comparing the color vector to each of a plurality of center vectors, wherein each of the plurality of center vectors corresponds to a color of the plurality of colors, and to generate an unbiased color vector based on the color vector and the bias vector, wherein the unbiased color vector indicates the color of the object.

DETAILED DESCRIPTION

Figure 1:
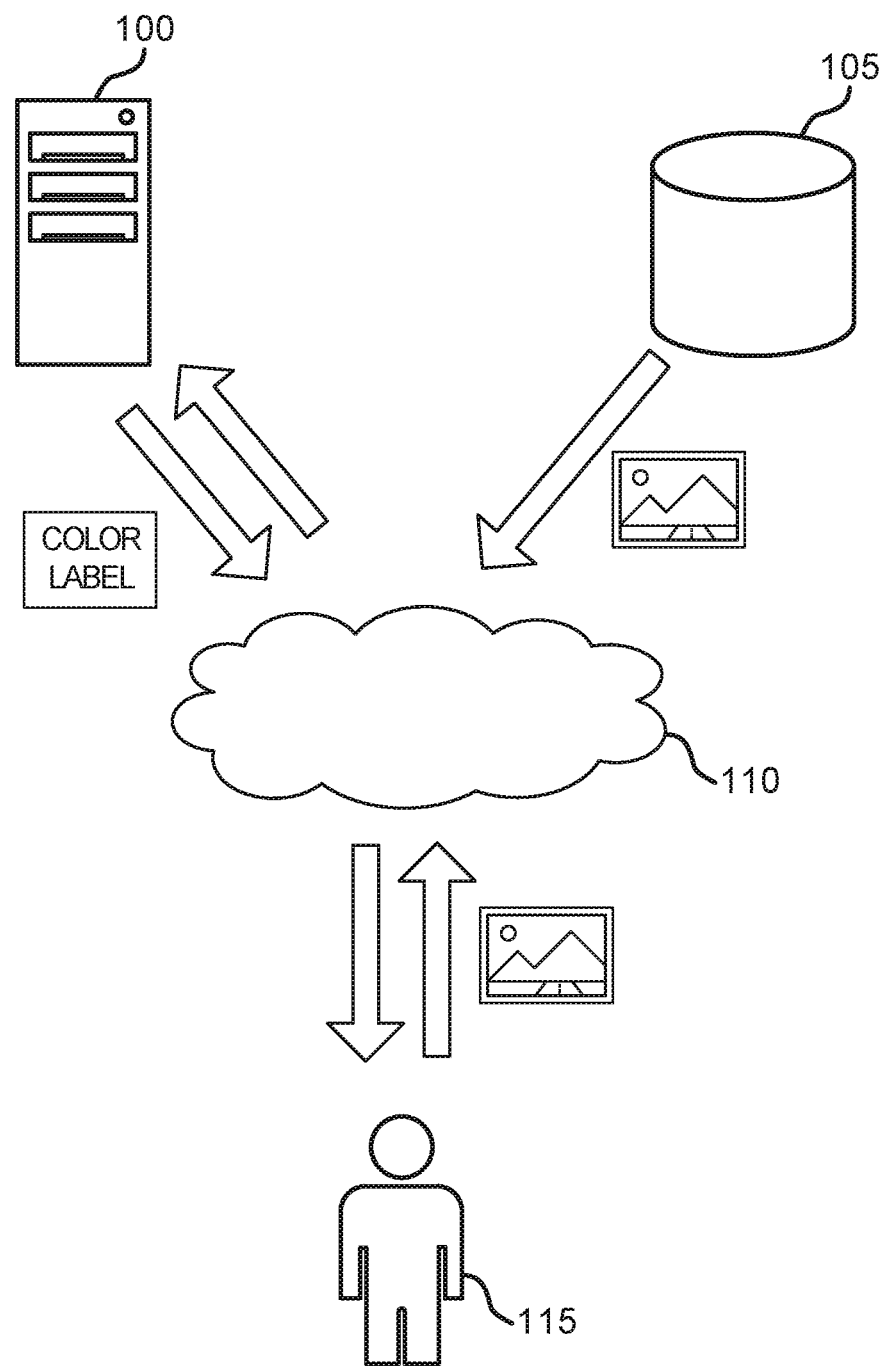
FIG. 1 shows an example of a color prediction system according to aspects of the present disclosure.

The present disclosure describes systems and methods for long-tail color prediction. Color prediction, or color attribute prediction, is a subset of general attribute prediction, which involves the prediction of attributes within an image. For example, models have been developed to identify facial attributes, personal attributes, and pedestrian characteristics.

Color prediction is a nontrivial task due to several factors related to human color perception. Humans demonstrate a wide breadth of perception and interpretation of color. In aggregate, however, users are able to agree on the color of an object in different conditions, despite the varying pixel data representing the object across those conditions. For example, users are able to identify that a car is red, though it may appear orange or dark brown in different lighting.

Further, they can identify the color of the car even if there are substantial reflections of surrounding scenery. Accordingly, embodiments of the color prediction system attempt to predict colors that align with the majority of users.

Training techniques may include re-sampling and category balancing losses. Other techniques can be applied after the training stage. One such technique is known as tau-normalization, which is a type of post-training calibration method. Tau-normalization can be agnostic to the training paradigm, is not necessarily dependent on any hypothesis about data distribution (i.e., solely based on analysis of the learned model), and may not require re-training of the model to balance performance of head and tail categories.

Post-training calibration through tau-normalization can also be used for long-tail recognition, such as in gender classification systems that rely on long-tail attributes. However in some cases, tau-normalization does not provide accurate results in the domain of long-tail color recognition. Tau-normalization removes bias from the final classification layers, which does not necessarily account for bias in the feature extraction layers of the trained model.

Embodiments of the present disclosure utilize a debiasing method that removes bias from both the feature extractor layers and the classifiers by utilizing the prediction from the bias-trained model. In some cases, predicting mean (i.e., average) features from the entire set of training data reveals prior bias from the trained model, and in such cases, deducting the average feature from a prediction can remove bias. Predicting average features from the entire dataset is known as a total direct effect (TDE) approach, and is another type of post-training calibration.

However, there are cases where the bias of the trained model can vary from the bias of the training distribution. When the bias of the model doesn't fully align with the bias of the training dataset, bias removal through TDE by using average features from the set including all categories can be insufficient. Instead, rather than predict average features from the entire set of data, embodiments calculate the average features for each category (i.e., color), which is robust to changes of the training data distribution.

Figure 2:
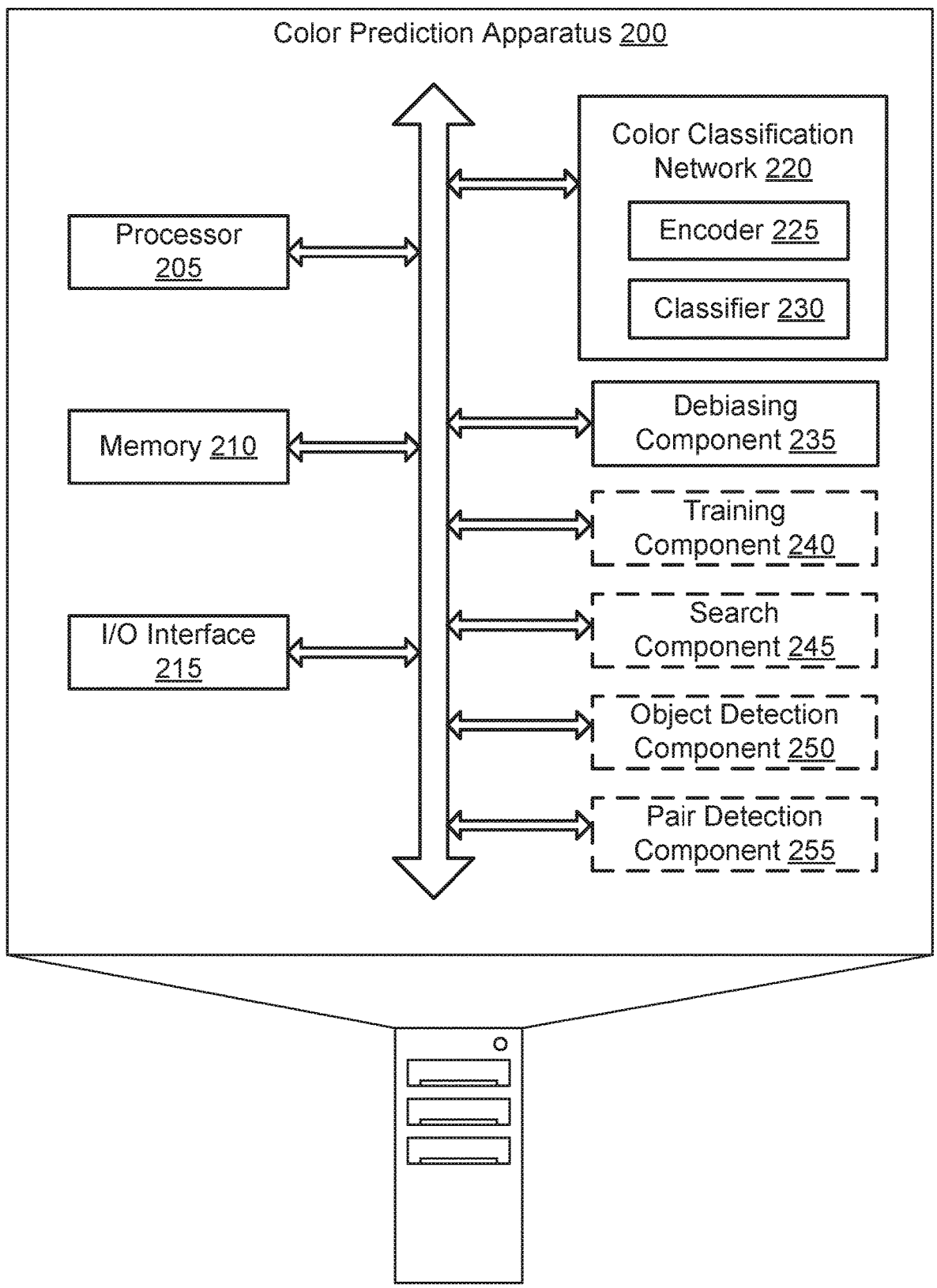
FIG. 2 shows an example of a color prediction apparatus according to aspects of the present disclosure.
Figure 3:
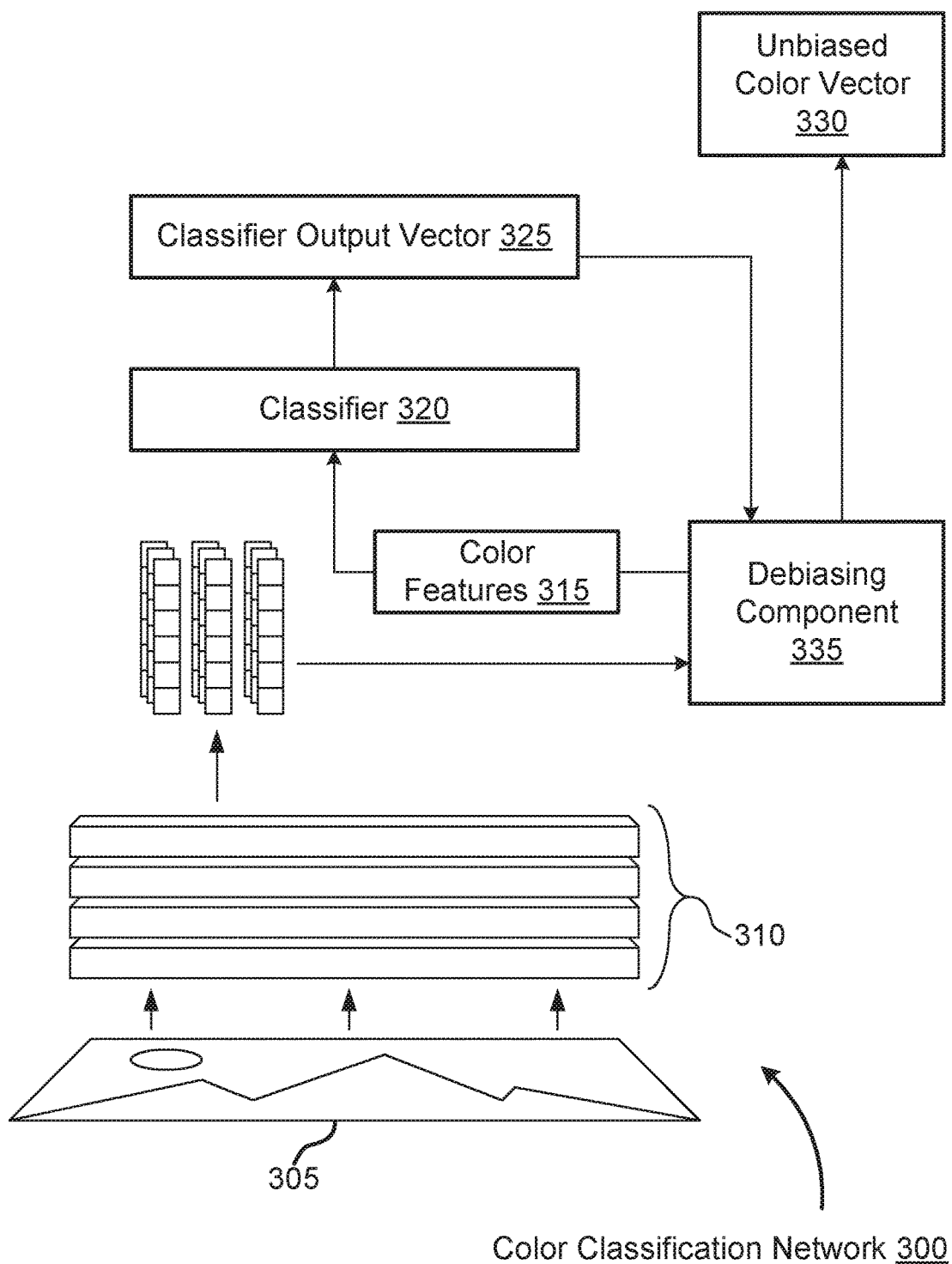
FIG. 3 shows an example of a color classification network according to aspects of the present disclosure.

Details regarding the architecture of an example color prediction system and apparatus are provided with reference to FIGS. 1-3. Example processes for color prediction and applications of the color prediction, such as image search and retrieval, are described with reference to FIGS. 4-8. Example training processes are described with reference to FIGS. 9-11.

Color Prediction System

An apparatus for color prediction is described. One or more aspects of the apparatus include a color classification network configured to generate a color vector based on an image, wherein the color vector comprises a color value corresponding to each of a plurality of colors and a debiasing component configured to generate a bias vector by comparing the color vector to each of a plurality of center vectors, wherein each of the plurality of center vectors corresponds to a color of the plurality of colors, and to generate an unbiased color vector based on the color vector and the bias vector, wherein the unbiased color vector indicates the color of the object.

Some examples of the apparatus, system, and method further include a training component configured to train the color classification network based on a training set including a plurality of training images and color data corresponding to the plurality of colors. Some examples further include an object detection component configured to generate bounding boxes for the plurality of training images. In some aspects, the color classification network comprises an encoder configured to generate color feature vectors and a classifier configured to generate color vectors based on the color feature vectors.

Some examples of the apparatus, system, and method further include a pair detection component configured to detect object-color pairs in the plurality of training images. Some examples further include a search component configured to generate metadata for the image based on the unbiased color vector and to retrieve the image based on the metadata.

FIG. 1 shows an example of a color prediction system according to aspects of the present disclosure. The example shown includes color prediction apparatus 100, database 105, network 110, and user 115.

In one example, user 115 provides an image to color prediction apparatus 100. The image may include an object with a color. In this example, user 115 uploads the image via a user interface or an I/O module. In another example, user 115 selects an image from database 105 to send to color prediction apparatus 100. The user interface or I/O module may be connected to network 110 in order to facilitate transfer of data between user 115, color prediction apparatus 100, and database 105.

Color prediction apparatus 100 then generates an unbiased color vector that indicates the color of the object in the image. Color prediction apparatus 100 then optionally provides the unbiased color vector to the user. In one example, color prediction apparatus 100 uses the unbiased color vector to generate a label or caption for the image, and stores the labeled image in database 105.

A database, such as database 105, is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user (e.g., user 115) interacts with a database controller. In other cases, the database controller may operate automatically without user interaction.

Network 110 may be referred to as a "cloud". A cloud is a computer network configured to provide on-demand availability of computer system resources, such as data storage and computing power. In some examples, the cloud provides resources without active management by user 115. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

In some examples, color prediction apparatus 100 is implemented on a local machine of user 115. Color prediction apparatus 100 may additionally be implemented on a networked server. A server provides one or more functions to users linked by way of one or more of various networks (e.g., network 110). In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, color prediction apparatus 100 generates an unbiased color vector based on the image and a set of center vectors using a color classification network. Color prediction apparatus 100 is an example of, or includes aspects of, the corresponding element described with reference to FIG. 2.

FIG. 2 shows an example of a color prediction apparatus 200 according to aspects of the present disclosure. The example shown includes color prediction apparatus 200, processor 205, memory 210, I/O interface 215, color classification network 220, training component 240, search component 245, object detection component 250, and pair detection component 255. In some aspects, color classification network 220 includes encoder 225 and classifier 230. Color prediction apparatus 200 is an example of, or includes aspects of, the corresponding element described with reference to FIG. 1.

One or more components of color prediction apparatus 200 may be implemented by processor 205. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array (e.g., memory 210) using a memory controller. In other cases, a memory controller is integrated into the processor. In some cases, the processor is configured to execute computer-readable instructions stored in a memory to perform various functions, such as functions used to execute the methods described herein. In some embodiments, a processor includes special purpose components for modem processing, baseband processing, digital signal processing, or transmission processing.

Memory 210 is used to store data, such as images, videos, and computer-readable instructions. Examples of a memory device include random access memory (RAM), read-only memory 210 (ROM), or disk drives such as mechanical spinning disks and solid state drives. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Embodiments of I/O interface 215 include a user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

Some embodiments of I/O interface 215 include an IO controller. An IO controller may manage input and output signals for a device. IO controller may also manage peripherals not integrated into a device. In some cases, an IO controller may represent a physical connection or port to an external peripheral. In some cases, an IO controller may utilize an operating system such as iOS®, ANDROID®, MS-DOS®, MS-WINDOWS @, OS/2®, UNIX®, LINUX®, or another known operating system. In other cases, an IO controller may represent or interact with a modem, a keyboard, a mouse, a touchscreen, or a similar device. In some cases, an IO controller may be implemented as part of a processor 205. In some cases, a user may interact with a device via IO controller or via hardware components controlled by an IO controller.

Embodiments of color classification network 220 include a neural network. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

According to some aspects, encoder 225 extracts a set of color feature vectors corresponding to a set of training images supplied to color classification network 220. Encoder 225 is an example of, or includes aspects of, the corresponding element described with reference to FIGS. 3 and 9.

In some examples, encoder 225 is used to generate encodings, features, or other representations of data input to color classification network 220. In at least one embodiment, encoder 225 includes a convolutional neural network to transform or extract information from images. A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

A standard CNN might not be suitable when the length of the output layer is variable, i.e., when the number of the objects of interest is not fixed. For example, some embodiments of color prediction apparatus 200 are able to identify multiple objects in an image, each with its own color. Selecting a large number of regions to analyze using conventional CNN techniques may result in computational inefficiencies. Thus, some embodiments of color classification network 220 include an R-CNN. In the R-CNN approach, a finite number of proposed regions are selected and analyzed. Other embodiments of color classification network 220 include a Fast R-CNN, Faster R-CNN, or similar region based convolutional network.

Some embodiments of color classification network 220 perform image segmentation in order to identify objects. Image segmentation is the process of partitioning a digital image into multiple segments (i.e., sets of pixels). Segmentation enables the simplification of an image into information that is easier to analyze. For example, image segmentation may be used to locate objects such as people, or alpha-numeric characters in images. In some cases, image segmentation includes assigning a label to every pixel in an image such that pixels with the same label share certain characteristics.

According to some aspects, color classification network 220 generates a color vector based on the image using a color classification network 220, where the color vector includes a color value corresponding to each of a set of colors. In some examples, color classification network 220 computes a set of average feature vectors corresponding to the set of colors, respectively, based on the set of color feature vectors. Color classification network 220 is an example of, or includes aspects of, the corresponding element described with reference to FIGS. 3 and 9.

Classifier 230 may be implemented as a separate neural network, or as a final layer or layer(s) of color classification network 220. Embodiments of classifier 230 are configured to generate a color vector based on color features generated from encoder 225. According to some aspects, classifier 230 generates a set of center vectors based on a set of average feature vectors, respectively. Classifier 230 is an example of, or includes aspects of, the corresponding element described with reference to FIGS. 3 and 9.

According to some aspects, debiasing component 235 generates a bias vector by comparing the color vector to each of the set of center vectors, where each of the set of center vectors corresponds to a color of the set of colors. In some examples, debiasing component 235 identifies a debiasing factor. In some examples, debiasing component 235 computes a distance function between the color vector and each of the set of center vectors based on the debiasing factor, where the bias vector is based on the distance function. The distance function will be described in further detail with reference to FIG. 3. In some examples, debiasing component 235 adds the color value to a corresponding bias value from the bias vector to obtain an unbiased color value, where the unbiased color vector includes the unbiased color value. Debiasing component 235 is an example of, or includes aspects of, the corresponding element described with reference to FIG. 3.

According to some aspects, training component 240 receives training data including a set of training images and color data corresponding to a set of colors. In some examples, training component 240 trains a color classification network 220 based on the training data. In some examples, training component 240 generates the color data based on the object-color pairs.

According to some aspects, training component 240 identifies a subset of the training images corresponding to each color of the set of colors, where each of the set of average feature vectors is based on a corresponding subset of the training images. According to some aspects, training component 240 is configured to train the color classification network 220 based on a training set including a plurality of training images and color data corresponding to the plurality of colors.

Training component 240 is an example of, or includes aspects of, the corresponding element described with reference to FIG. 9. In at least one embodiment, training component 240 is implemented in an apparatus other than color prediction apparatus 200.

According to some aspects, search component 245 generates metadata for the image based on the unbiased color vector. In some examples, search component 245 receives a search query including the color. The search query may be provided by a user, such as user 115 described with reference to FIG. 1. In some examples, search component 245 retrieves the image based on the search query and the metadata. In at least one embodiment, search component 245 is implemented in an apparatus other than color prediction apparatus 200.

According to some aspects, object detection component 250 performs object detection on the set of training images to obtain bounding boxes corresponding to objects in the set of training images. In some examples, object detection component 250 crops at least one of the set of training images based on the bounding boxes to obtain cropped training images, where the color classification network 220 is trained based on the cropped training images and corresponding colors from the object-color pairs. In at least one embodiment, object detection component 250 is implemented in an apparatus other than color prediction apparatus 200.

According to some aspects, pair detection component 255 is configured to detect object-color pairs in the plurality of training images. In some cases, training images provided to color prediction apparatus 200 are labeled with captions. According to some aspects, pair detection component 255 detects object-color pairs in the captions. In at least one embodiment, pair detection component 255 is implemented in an apparatus other than color prediction apparatus 200.

FIG. 3 shows an example of a color classification network 300 according to aspects of the present disclosure. The example shown includes color classification network 300, input image 305, encoder 310, color features 315, classifier 320, classifier output vector 325, unbiased color vector 330, and debiasing component 335.

In an example process, input image 305 is sent to color classification network 300. Encoder 310 of color classification network 300 extracts encodings from input image 305. Then debiasing component 335 deducts average features from the encodings to generate color features 315. Color features 315 are applied to classifier 320, and classifier 320 generates classifier output vector 325. In some examples, classifier output vector 325 is a "sparse output" color vector, which will be discussed in further detail below. In some embodiments, classifier 320 generates a plurality of center feature vectors from, for example, training data. Then, debiasing component 325 computes a distance between the center feature vectors and classifier output vector 325. Then, debiasing component 335 outputs unbiased color vector 330 which includes a color from an object in input image 305, where the unbiased color vector 330 is based on the distance.

Thus, embodiments are able to remove bias from the encoder portion of color classification network 300 by deducting average features from the output of the encoder. Embodiments are further able to remove bias from the classifier layer(s) of classification network 300 by computing a distance between the output of the classifier and center vectors, generating a bias vector based on the distance, and combining the bias vector with the classifier output. Further detail about these techniques is provided below with reference to FIG. 7. Color classification network 300 is an example of, or includes aspects of, the corresponding element described with reference to FIGS. 2 and 9. Encoder 310 is an example of, or includes aspects of, the corresponding element described with reference to FIGS. 2 and 9. Color features 315 are an example of, or includes aspects of, the corresponding elements described with reference to FIG. 9.

Classifier 320 is an example of, or includes aspects of, the corresponding element described with reference to FIGS. 2 and 9. Classifier output vector 325 is an example of, or includes aspects of, the corresponding element described with reference to FIG. 9. Debiasing component 335 is an example of, or includes aspects of, the corresponding element described with reference to FIG. 2. In some embodiments, debiasing component 335 is implemented within the same system as color classification network 300. Alternatively, debiasing component may be implemented in another system that interfaces with color classification network 300.

Color Prediction

A method for color prediction is described. One or more aspects of the method include receiving an image that includes an object comprising a color; generating a color vector based on the image using a color classification network, wherein the color vector comprises a color value corresponding to each of a plurality of colors; generating a bias vector by comparing the color vector to each of a plurality of center vectors, wherein each of the plurality of center vectors corresponds to a color of the plurality of colors; and generating an unbiased color vector based on the color vector and the bias vector, wherein the unbiased color vector indicates the color of the object.

Some examples of the method, apparatus, non-transitory computer readable medium, and system further include extracting a plurality of color feature vectors corresponding to a plurality of training images from an encoder of the color classification network. Some examples further include computing a plurality of average feature vectors corresponding to the plurality of colors, respectively, based on the plurality of color feature vectors. Some examples further include generating the plurality of center vectors based on the plurality of average feature vectors, respectively, using a classifier of the color classification network.

Some examples of the method, apparatus, non-transitory computer readable medium, and system further include identifying a subset of the training images corresponding to each of the plurality of colors, wherein each of the plurality of average feature vectors is based on a corresponding subset of the training images. Some examples further include identifying a debiasing factor. Some examples further include computing a distance function between the color vector and each of the plurality of center vectors based on the debiasing factor, wherein the bias vector is based on the distance function.

Some examples of the method, apparatus, non-transitory computer readable medium, and system further include adding the color value to a corresponding bias value from the bias vector to obtain an unbiased color value, wherein the unbiased color vector includes the unbiased color value. In some aspects, the unbiased color value represents a probability that the object comprises the color.

Some examples of the method, apparatus, non-transitory computer readable medium, and system further include generating metadata for the image based on the unbiased color vector. Some examples further include receiving a search query comprising the color. Some examples further include retrieving the image based on the search query and the metadata.

Figure 4:
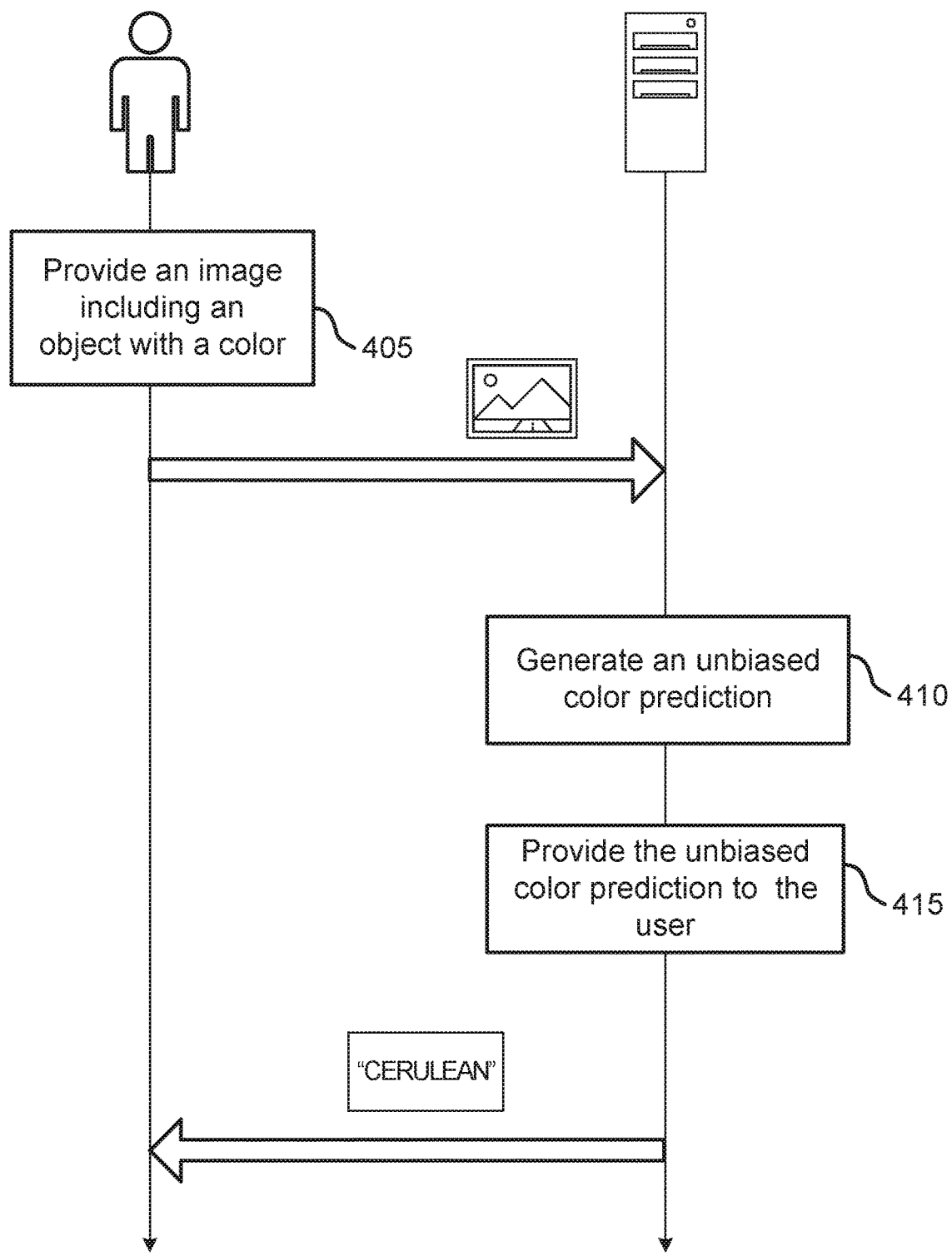
FIG. 4 shows an example of a method for predicting a color according to aspects of the present disclosure.

FIG. 4 shows an example of a method 400 for predicting a color according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides an image including an object with a color. The user may select an image including colors that he/she wishes to identify. For example, the user may want to identify "long-tail" or rare colors represented in the image, so that the user can perform a search on that color to find similar images.

At operation 410, the system generates unbiased color prediction. In one example, generating the unbiased color prediction includes determining average features for colors represented in a training dataset, generating center vectors based on the average features, deducing average features from an encoding of the input image to generate color features, and applying the color features to a classifier to generate a color vector. Then the system identifies a debiasing factor, computes a distance between the color vector and the center vectors based on the debiasing factor, and generates a bias vector based on the distance. Finally, the system applies the bias vector to the color vector to generate the unbiased color prediction. This process is discussed in greater detail with reference to FIG. 7.

At operation 415, the system provides unbiased color prediction to the user. In one example, the system provides the unbiased color prediction to the user through a user interface, such as through a web-based interface or a software graphical user interface. The system may additionally label the image, and store the labeled image in a database.

Figure 5:
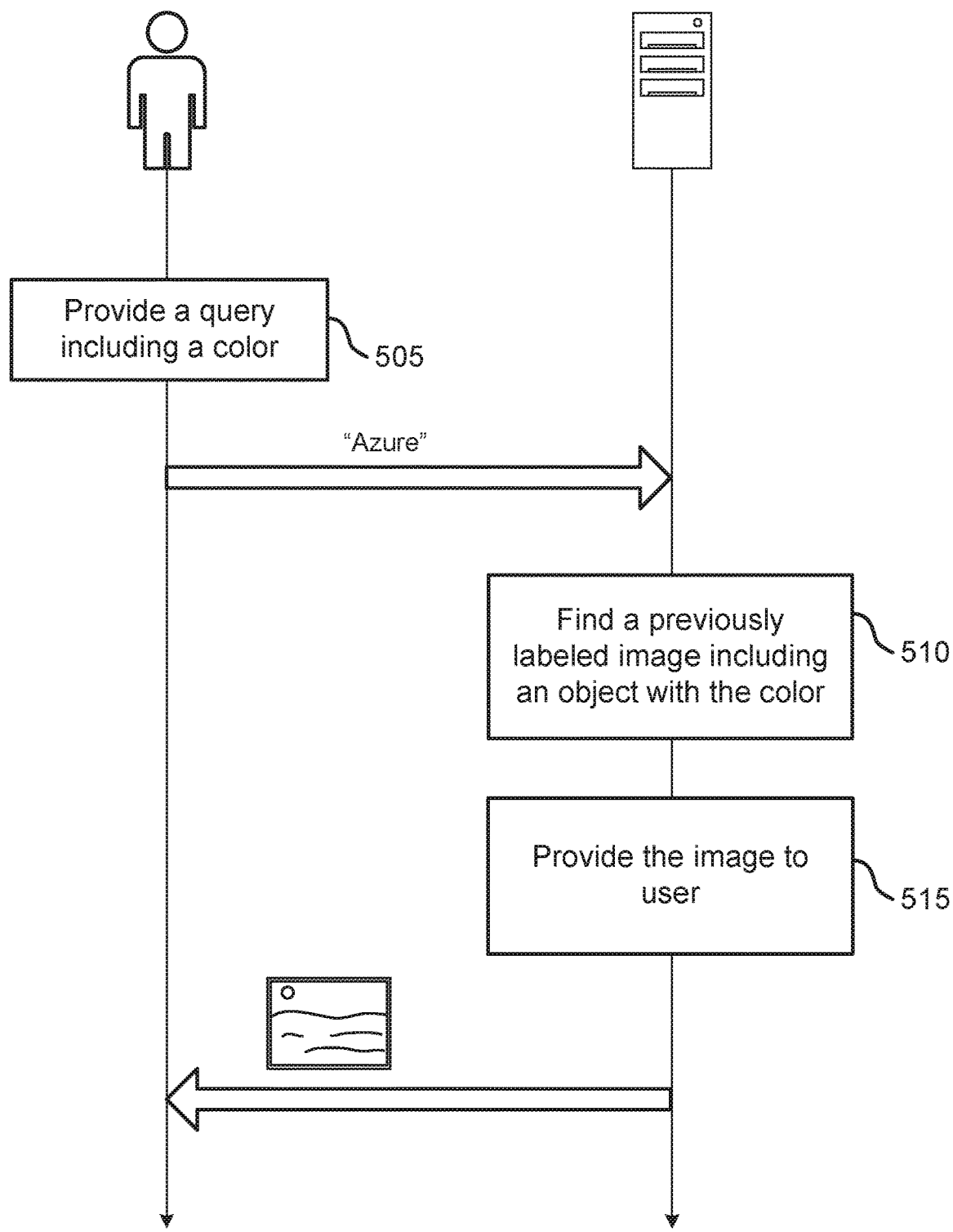
FIG. 5 shows an example of a method for finding an image including a color according to aspects of the present disclosure.

FIG. 5 shows an example of a method 500 for finding an image including a color according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the user provides a query including a color. In the example illustrated, the query could be a color such as "azure", or, in other examples, the query may be a color-object pair such as "azure lake" or the like.

At operation 510, the system finds a previously labeled image including an object with the color. For example, the system may search through a database for images that are labeled with "azure" or similar colors. In one embodiment, the system searches through the database by comparing a distance between the query and metadata of images stored in the database based on a distance function.

At operation 515, the system provides an image to the user. In one example, the system provides the image to a device of the user, such as a phone or a computer, in the form of a download. In another example, the system provides a reference to the image, such as a URL.

Figure 6:
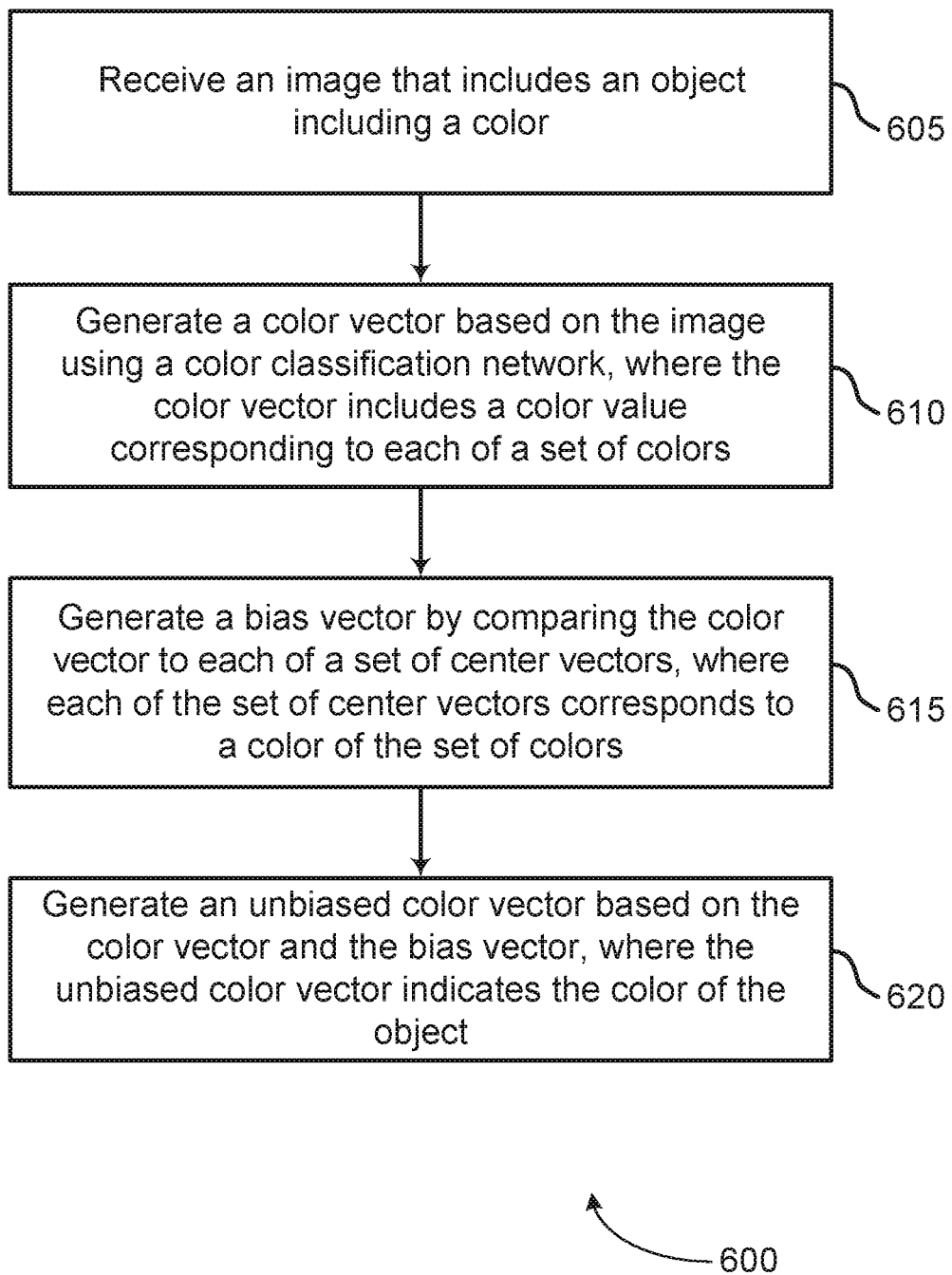
FIG. 6 shows an example of a method for predicting the color of an object according to aspects of the present disclosure.

FIG. 6 shows an example of a method 600 for predicting the color of an object according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an image that includes an object including a color. In some cases, the operations of this step refer to, or may be performed by, a color prediction apparatus as described with reference to FIGS. 1 and 2. In one example, the system receives an image provided by a user that is uploaded through a network, or referenced in a database. In another example, the system receives the image through an automated process, such as a scheduled batch process for labeling images.

At operation 610, the system generates a color vector based on the image using a color classification network, where the color vector includes a color value corresponding to each of a set of colors. In some cases, the operations of this step refer to, or may be performed by, a color classification network as described with reference to FIGS. 2 and 3. In at least one embodiment, the color vector is generated by a classifier of the color classification network, as described in further detail with reference to FIG. 3.

At operation 615, the system generates a bias vector by comparing the color vector to each of a set of center vectors, where each of the set of center vectors corresponds to a color of the set of colors. A bias vector is a representation of the distance between the color vector output from the classifier and a center vector, such as a center vector of a corresponding head color. In some cases, the operations of this step refer to, or may be performed by, a debiasing component as described with reference to FIGS. 2 and 3. In some embodiments, the set of center vectors are generated based on a plurality of average feature vectors obtained by an encoder from a plurality of training images. In an example, the set of center vectors are stored in memory, and then used at inference time to determine a bias vector for a given color vector. In another example, the plurality of average feature vectors are combined with an encoding of the input image, and this combination is provided to the classifier to generate the color vector. In such cases, some bias is removed from the color features before the color vector is generated. This process is described in greater detail below with reference to FIG. 7.

At operation 620, the system generates an unbiased color vector based on the color vector and the bias vector, where the unbiased color vector indicates the color of the object. In some cases, the operations of this step refer to, or may be performed by, a color prediction apparatus as described with reference to FIGS. 1 and 2. In some examples, the generation of the unbiased color vector is performed by a debiasing component as described with reference to FIGS. 2 and 3. The removal of bias using the color vector and the bias vector is in accordance with the Classifier Sparse Encoding (CSE) described above with reference to FIG. 3.

By using the above described techniques, embodiments of the present disclosure are able to remove bias from both the features generated by the encoder of the color classification network, as well as bias from the classifier (e.g., classifier layer(s)) of the color classification network. Accordingly, embodiments of the present disclosure can accurately identify or predict long-tail colors included in an image. The following will describe generating an unbiased color vector in greater detail.

Figure 7:
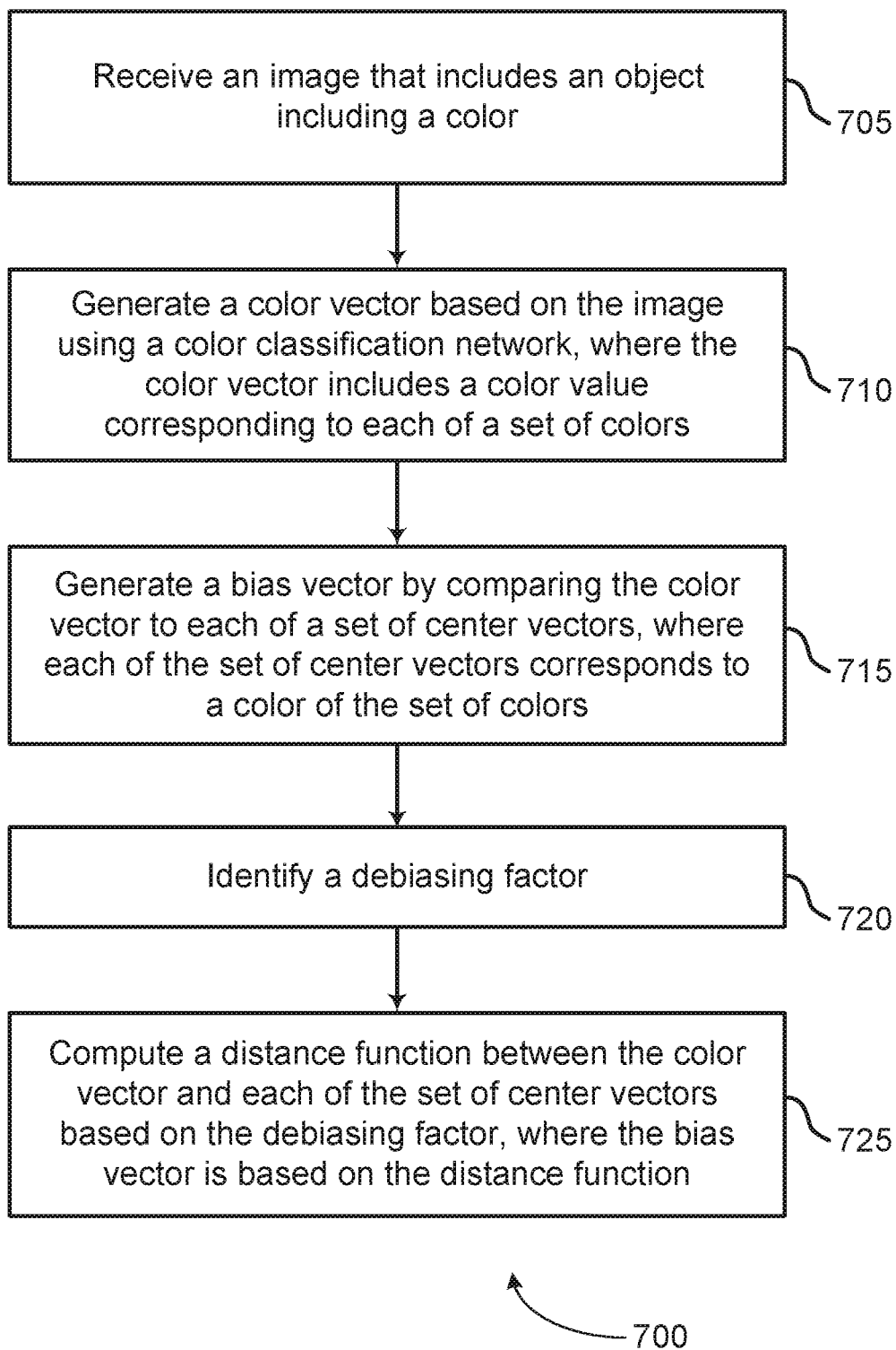
FIG. 7 shows an example of a method for generating a bias vector according to aspects of the present disclosure.

FIG. 7 shows an example of a method 700 for generating a bias vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Attribute prediction models aim to correctly guess the presence of an attribute in some data. One way to evaluate attribute prediction models is to measure how often the correct attribute is predicted in a result containing K-guesses. By taking the mean recall of all color categories as the evaluation metrics for long-tail color recognition, the category-balanced variation for a total color category set $\mathcal{C}$ is expressed as follows:

$$mRecall@K = \frac{1}{|\mathcal{C}|}\sum_{c \in \mathcal{C}}\sum_{i \in \mathcal{T}} \frac{\delta(c \in y_i)}{\sum_{i \in \mathcal{T}}\delta(c \in y_i)} \frac{|\hat{y}_t^{topK} \cap y_i|}{|y_i|} \quad (1)$$

where K is the number of returned predictions, $\delta(c \in y_i)=1$ if the color category c is in in $y_i$ and otherwise, $\delta(c \in y_i)=0$. mRecall refers to mean recall, which is the mean value of the model's recall (i.e., prediction) for all classes (i.e., colors). Without any removal of bias from a model trained on a biased dataset, the recall@2 for many tail-colors are zeros. This means that, in many cases, the biased models are unable to suggest that the tail-colors are included in the image.

Some embodiments address bias in the encoding layers, and may additionally or alternatively address bias in the classifier layers. Normalization of the classifier weights $\hat{W}$ can be used to remove the bias for long-tail attribute recognition. Such normalization scales each row $w_j$ in the classifier weights by:

$$\hat{w}_j = \frac{w_j}{\|w_j\|^\tau} \quad (2)$$

where $\tau$ is a controlling debias factor. Then, an unbiased prediction for sample i becomes $\tilde{y}=\hat{W}f_i$.

This technique is known as tau-normalization. While the tau-normalization method exhibits increase in recall performance for other attribute predictions, mRecall values saturate in color prediction, even with the $\tau$ value reaches high values. Accordingly, solely removing bias from the classifier does not remove bias for color.

Another technique for removing bias from a prediction involves predicting average features from a whole training dataset. This is the TDE approach as described above. For example, in the context of color recognition, it is possible that bias lies in features generated before the classifier. Embodiments apply a variation of bias removal by TDE, in which average features are predicted for each category c rather than across the entire dataset, which provides representative outputs despite hard samples included in the training dataset.

With $f_i$ as the feature vector of the instance i, the prediction of average feature in color category c is:

$$\bar{y}^c = w \frac{\sum_{i \in \mathcal{T}} \delta(c \in y_i) f_i}{\sum_{i \in \mathcal{T}} \delta(c \in y_i)} + B \quad (3)$$

where W and B denote the weights and bias (i.e., bias as neural network parameters, not the color bias) in the classifier layer. The prediction of average feature in color category c with the bias removed is therefore:

$$\hat{y}^c = \bar{y}^c - \left( W \frac{\sum_{i \in \mathcal{T}} \delta(c \in y_i) f_i}{|\mathcal{T}|} + B \right) \quad (4)$$

This is also equivalent to calculating the mean predictions for all the samples within the same category (i.e., color) since both the classifier and the averaging operation are linear.

The per-category TDE approach removes bias from the prediction and results in the activation of tail colors when analyzing a dataset. However, in some cases, color features co-activate correlated head colors. This is referred to as co-activation of entangled features, and is a result of language attention within the model. In an illustrative example in the scene graph detection domain, a head relation "on" may be highly correlated to tailed relations such as "sitting on," "walking on,", "standing on," etc. In color detection, this can result in a head color like "red" being linked to tail color "scarlet." Accordingly, while per-category TDE removes bias from the encoder output, such co-activation and feature entanglement may not be fully reduced by only removing bias in the features.

Embodiments utilize a technique called Classifier Sparse Encoding (CSE) to remove bias from the classifier as well as from the features. Experimental data shows that co-activation of entangled features is asymmetrical and biased towards head colors. Further, the output layer of the model produces a sparse vector (i.e., mostly zero-valued vector). Taking the prediction of the output layer as a sparse encoded feature suggests that the model tends to describe colors using head colors. This means that the mean prediction is sparse and separable, which allows for CSE, in which mean predictions are used as centers for distance based classification. Accordingly, the base prediction from the classifier (e.g., classifier output vector 325) can be taken as a feature, and the distance to each center c is determined by:

$$\hat{w}_i^c = -\|\bar{y}_i - \hat{y}^c\|^p \quad (5)$$

where p is a debiasing factor, which is L2 distance when p=2, and where $\|*\|$ denotes the norm. Then, based off the unbiased prediction and original prediction above, the final prediction becomes:

$$\hat{y}^i = -\{\bar{y}_i^c + \hat{w}_i^c\}_{c \in \mathcal{C}} \quad (6)$$

Through these techniques, embodiments calculate feature bias for each category, which is more robust to changes in data distribution across datasets. Further, because the classifier layer is linear, the prediction of average features is equivalent to mean prediction of sampled features. The TDE approach alone supposes that the bias is dependent only on the feature distributions of the whole training dataset $\{f_i\}_{i \in \mathcal{T}}$, which is arguably similar to prediction of the whole training dataset $\{\tilde{y}_i\}_{i \in \mathcal{T}}$. However, as discussed above, the change of mean prediction of the entire set of training samples does not necessarily lead to the change of bias in model training. In an illustrative example, taking a trained model which perfectly predicts head colors and overfits the training samples in the head colors, and then adding more trivial samples for those head colors to fine-tune the training would only slightly affect the model training when gradients are small. In that scenario, the bias calculation from TDE will be changed and not in line with effects of the trained model. By contrast, embodiments using the per-category TDE combined with CSE incorporate the average features for each category, which is more robust to changes in data distribution.

Accordingly embodiments are able to remove bias from the features using TDE techniques applied for each category, and are able to remove bias from the classifier layer by leveraging the sparse encoding ability of the classifier layer as described in Equations (5) and (6).

Referring again to FIG. 7, at operation 705, the system receives an image that includes an object including a color. In some cases, the operations of this step refer to, or may be performed by, a color prediction apparatus as described with reference to FIGS. 1 and 2.

At operation 710, the system generates a color vector based on the image using a color classification network, where the color vector includes a color value corresponding to each of a set of colors. In some cases, the operations of this step refer to, or may be performed by, a color classification network as described with reference to FIGS. 2, 3, and 9. At operation 715, the system generates a bias vector by comparing the color vector to each of a set of center vectors, where each of the set of center vectors corresponds to a color of the set of colors. In some cases, the operations of this step refer to, or may be performed by, a debiasing component as described with reference to FIGS. 2 and 3.

At operation 720, the system identifies a debiasing factor. In some cases, the operations of this step refer to, or may be performed by, a debiasing component as described with reference to FIGS. 2 and 3. With reference to Equations (5) and (6) above, the debiasing factor may be used to determine an amount of debiasing applied to a color vector.

At operation 725, the system computes a distance function between the color vector and each of the set of center vectors based on the debiasing factor, where the bias vector is based on the distance function as described by Equation (5) with reference to FIG. 3. Some embodiments use a debiasing factor of 2, which scales the amount of debiasing applied to the color vector based on the distance function. Accordingly, in some embodiments, the bias vector is determined by the distance function and the debiasing factor. In some cases, the operations of this step refer to, or may be performed by, a debiasing component as described with reference to FIGS. 2 and 3.

Color prediction has several downstream applications. For example, the systems described herein may be used to generate labels for images. The labeled images can be stored in, for example, a database, and later retrieved by a search.

Figure 8:
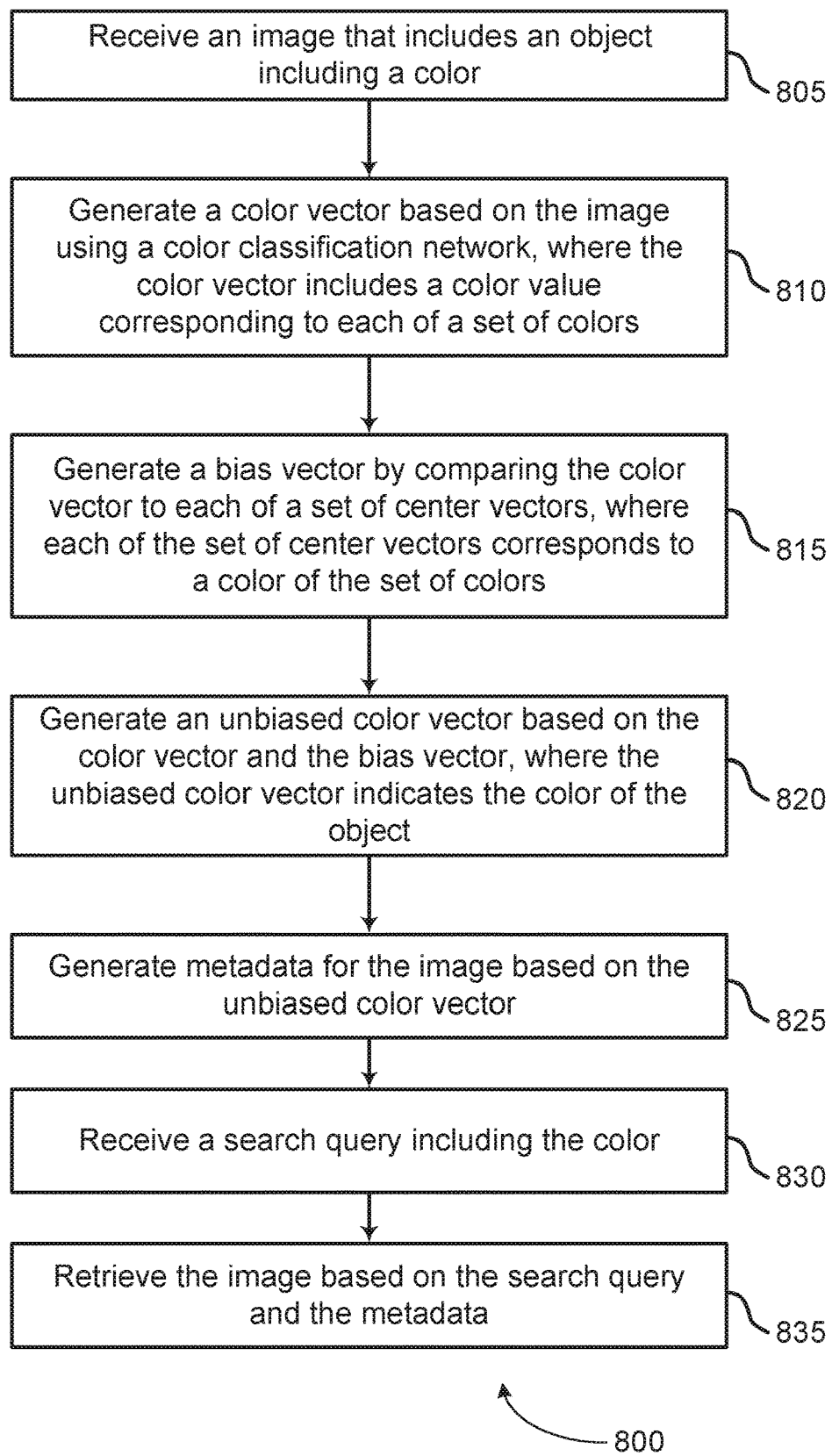
FIG. 8 shows an example of a method for retrieving an image according to aspects of the present disclosure.

FIG. 8 shows an example of a method 800 for retrieving an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives an image that includes an object including a color. In some cases, the operations of this step refer to, or may be performed by, a color prediction apparatus as described with reference to FIGS. 1 and 2. At operation 810, the system generates a color vector based on the image using a color classification network, where the color vector includes a color value corresponding to each of a set of colors. In some cases, the operations of this step refer to, or may be performed by, a color classification network as described with reference to FIGS. 2, 3, and 9. At operation 815, the system generates a bias vector by comparing the color vector to each of a set of center vectors, where each of the set of center vectors corresponds to a color of the set of colors. In some cases, the operations of this step refer to, or may be performed by, a debiasing component as described with reference to FIGS. 2 and 3. At operation 820, the system generates an unbiased color vector based on the color vector and the bias vector, where the unbiased color vector indicates the color of the object. In some cases, the operations of this step refer to, or may be performed by, a color prediction apparatus as described with reference to FIGS. 1 and 2.

At operation 825, the system generates metadata for the image based on the unbiased color vector. In some cases, the operations of this step refer to, or may be performed by, a search component as described with reference to FIG. 2. The metadata for the image may include a semantic label of the color. For example, the classifier of the color classification network may include output nodes that are mapped to colors in a set of colors. Once the color vector from the classifier is adjusted by the bias vector to form an unbiased color vector, the label may be generated based on values from the unbiased color vector corresponding to the nodes of the classifier. In another example, the metadata may include an intermediate representation of the color other than the semantic information. In some examples, the system further generates metadata corresponding to objects in the image. The system may then combine the metadata corresponding to the objects with metadata corresponding to the color.

At operation 830, the system receives a search query including the color. In some cases, the operations of this step refer to, or may be performed by, a search component as described with reference to FIG. 2. Further detail regarding a search query including a color is provided with reference to FIG. 5. At operation 835, the system retrieves the image based on the search query and the metadata. In some cases, the operations of this step refer to, or may be performed by, a search component as described with reference to FIG. 2.

Training

A method for color prediction is described. One or more aspects of the method include receiving training data comprising a plurality of training images and color data corresponding to a plurality of colors; training a color classification network based on the training data; generating a plurality of center vectors corresponding to the plurality of colors, respectively, using the color classification network; receiving an image that includes an object comprising a color; and generating an unbiased color vector based on the image and the plurality of center vectors using the color classification network.

Some examples of the method, apparatus, non-transitory computer readable medium, and system further include detecting object-color pairs in captions describing the plurality of training images. Some examples further include generating the color data based on the object-color pairs. Some examples further include performing object detection on the plurality of training images to obtain bounding boxes corresponding to objects in the plurality of training images. Some examples further include cropping at least one of the plurality of training images based on the bounding boxes to obtain cropped training images, wherein the color classification network is trained based on the cropped training images and corresponding colors from the object-color pairs.

Some examples of the method, apparatus, non-transitory computer readable medium, and system further include extracting a plurality of color feature vectors corresponding to the plurality of training images from an encoder of the color classification network. Some examples further include computing a plurality of average feature vectors corresponding to the plurality of colors, respectively, based on the plurality of color feature vectors, wherein the unbiased color vector is based on the plurality of average feature vectors. Some examples further include identifying a subset of the training images corresponding to each of the plurality of colors, wherein each of the plurality of average feature vectors is based on a corresponding subset of the training images.

Some examples further include generating a color vector based on the image using a color classification network, wherein the color vector comprises a color value corresponding to each of a plurality of colors. Some examples further include generating a bias vector by comparing the color vector to each of a plurality of center vectors, wherein the unbiased color vector is based on the color vector and the bias vector. Some examples further include computing a distance function between the color vector and each of the plurality of center vectors, wherein the bias vector is based on the distance function.

Figure 9:
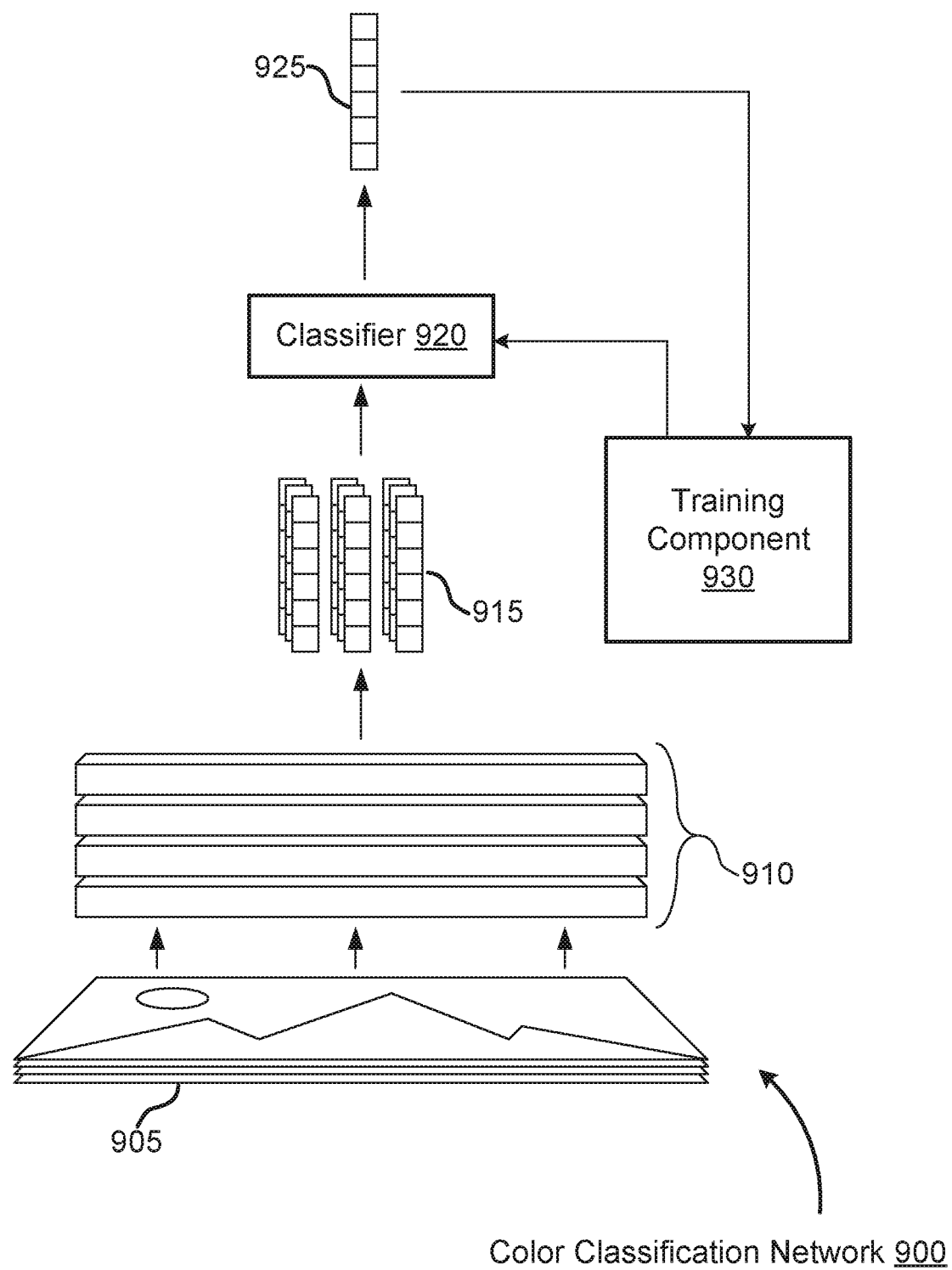
FIG. 9 shows an example of a color classification network according to aspects of the present disclosure.

FIG. 9 shows an example of a color classification network 900 according to aspects of the present disclosure. The example shown includes color classification network 900, training input image 905, encoder 910, color features 915, classifier 920, classifier output vector 925, and training component 930.

Color classification network 900 is an example of, or includes aspects of, the corresponding element described with reference to FIGS. 2 and 3. Color classification network 900 is similar to the corresponding color classification network illustrated in FIG. 3, except that color classification network 900 does not include the debiasing component, and instead includes training component 930. Some embodiments of the color classification network may include both the debiasing component and the training component.

Encoder 910 is an example of, or includes aspects of, the corresponding element described with reference to FIGS. 2 and 3. Color features 915 is an example of, or includes aspects of, the corresponding element described with reference to FIG. 3.

Classifier 920 is an example of, or includes aspects of, the corresponding element described with reference to FIGS. 2 and 3. Classifier output vector 925 is an example of, or includes aspects of, the corresponding element described with reference to FIG. 3.

Training component 930 is an example of, or includes aspects of, the corresponding element described with reference to FIG. 2. In one example, training component 930 receives a color vector (e.g., classifier output vector 925) from classifier 920. Then, training component 930 updates parameters of encoder 910, classifier 920, or a combination thereof based on classifier output vector 925. For example, training component 930 may update parameters of encoder 910, classifier 920, or combination thereof according to a loss-function. Some examples of training component 930 use backpropagation to update parameters of the entire network.

In some embodiments, color classification network 900 is based on a Faster R-CNN architecture. In some embodiments, color classification network 900 can be trained end-to-end by training component 930. In other embodiments, color classification network 900 contains multiple components that are trained in different training stages.

Figure 10:
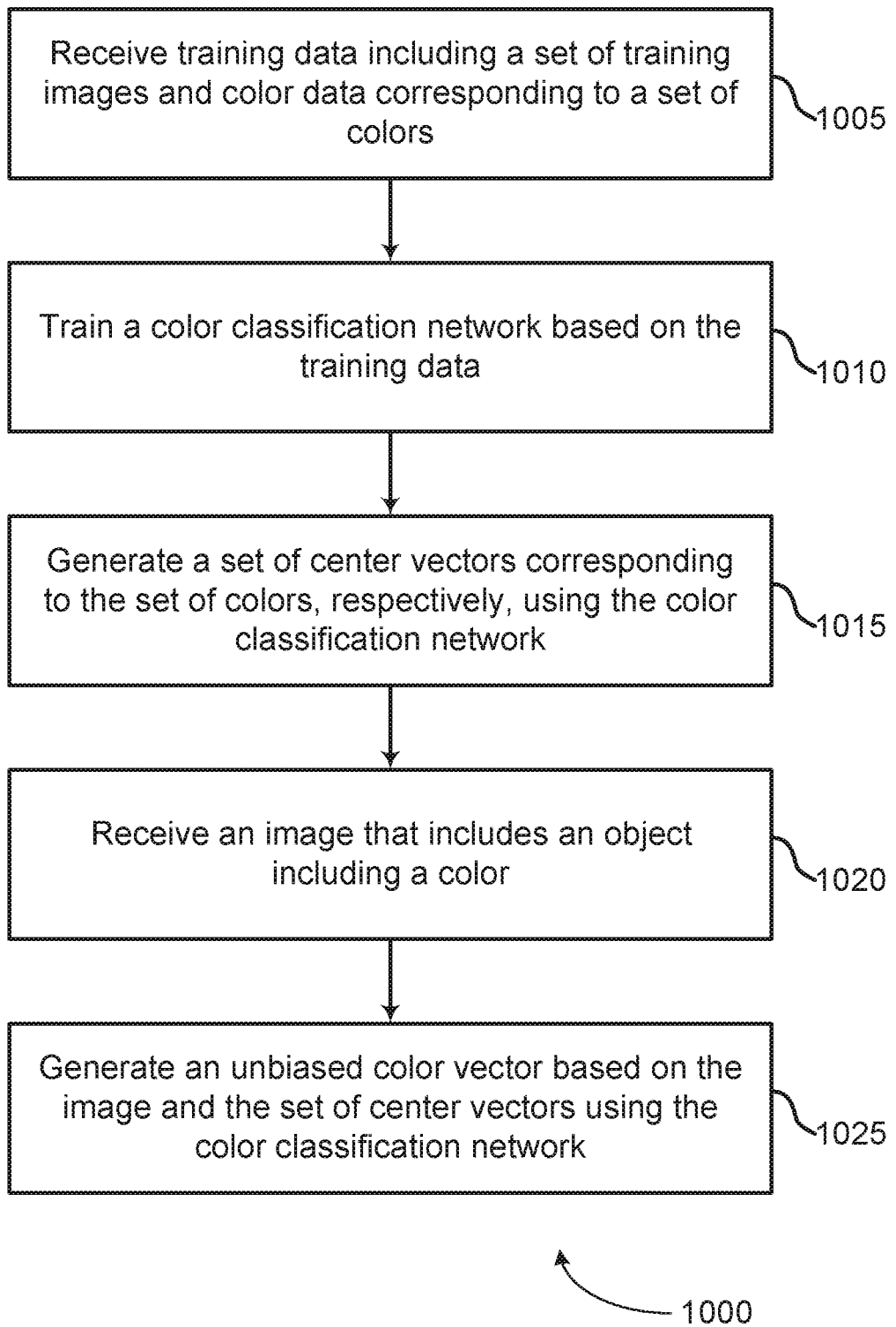
FIG. 10 shows an example of a method for training a color classification network according to aspects of the present disclosure.

FIG. 10 shows an example of a method 1000 for training a color classification network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives training data including a set of training images and color data corresponding to a set of colors. For example, the color data may include labels or captions indicating an object and its color contained within the image. Examples of such captions include "white boat," "chartreuse building," "azure ocean," and the like. In some cases, the training data is pre-labeled by a human operator, and is considered ground truth data. In some cases, the operations of this step refer to, or may be performed by, a training component as described with reference to FIGS. 2 and 9.

At operation 1010, the system trains a color classification network based on the training data. Some embodiments of the system utilize a self-supervised training paradigm. For example, some embodiments train according to a contrastive learning loss, where the loss is based on positive and negative samples. In some cases, the positive samples are generated through augmentation processes, and the negative samples are selected from among other training images. In some cases, the training data is provided without the need for further processing or augmentation, and in such cases, embodiments may be trained in a supervised or semi-supervised manner. Examples of training methods are provided with reference to FIG. 9. In some embodiments, training is applied to an encoder, a classifier, an object detection component, a pair detection component, or a combination thereof. For example, in some cases, the training data includes training images, color data including color labels, region data (e.g., bounding boxes), and object data, and the above-referenced components are trained based on the training data. In some cases, the operations of this step refer to, or may be performed by, a training component as described with reference to FIGS. 2 and 9.

At operation 1015, the system generates a set of center vectors corresponding to the set of colors, respectively, using the color classification network. In some cases, the operations of this step refer to, or may be performed by, a color classification network as described with reference to FIGS. 2, 3, and 9. For example, the set of center vectors may be stored in a memory as described with reference to FIG. 2. Then, the set of center vectors may be used to remove bias from an output of the encoder at inference time. In some examples, the set of center vectors are generated based on a set of average vectors determined from the training data.

At operation 1020, the system receives an image that includes an object including a color. In some cases, the operations of this step refer to, or may be performed by, a color prediction apparatus as described with reference to FIGS. 1 and 2. In one example, the system receives an image provided by a user that is uploaded through a network, or referenced in a database. In another example, the system receives the image through an automated process, such as a scheduled batch process for labeling images.

At operation 1025, the system generates an unbiased color vector based on the image and the set of center vectors using the color classification network. In some cases, the operations of this step refer to, or may be performed by, a color prediction apparatus as described with reference to FIGS. 1 and 2. The generation of the unbiased color vector is described in further detail with reference to FIGS. 3, 6, and 7.

Figure 11:
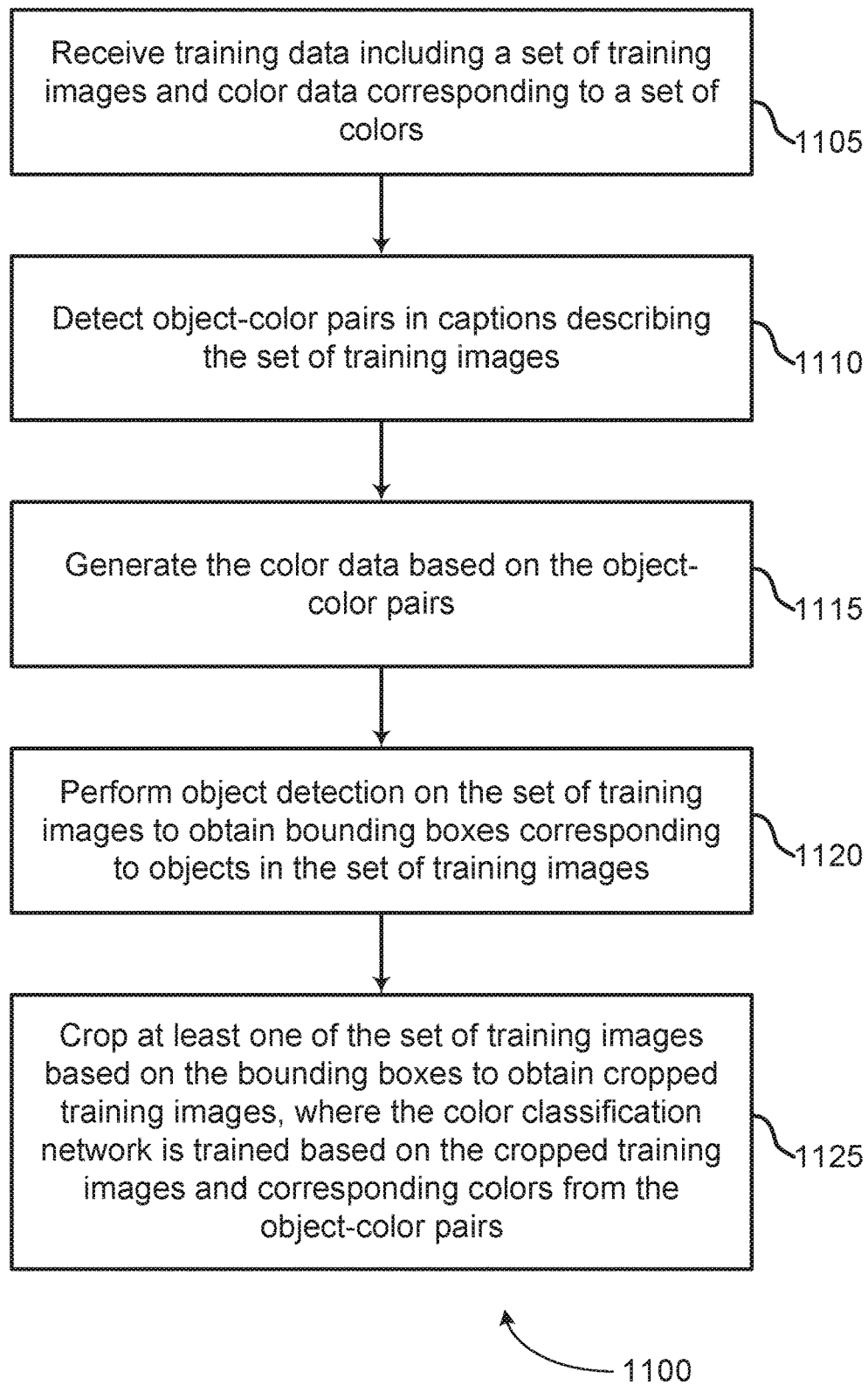
FIG. 11 shows an example of a method for generating cropped training images according to aspects of the present disclosure.

In some cases, the training data provided to the system is further processed before it is used to train the network. For example, when the training data does not contain region data or object data, the system may perform FIG. 11 shows an example of a method 1100 for generating cropped training images according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system receives training data including a set of training images and color data corresponding to a set of colors. In some cases, the operations of this step refer to, or may be performed by, a training component as described with reference to FIGS. 2 and 9.

At operation 1110, the system detects object-color pairs in captions describing the set of training images. In some cases, the operations of this step refer to, or may be performed by, a pair detection component as described with reference to FIG. 2. In some embodiments, pair detection component includes a transformer network or an RNN in order to determine the object-color pairs from the captions. In some examples, the pair detection component includes a classification component configured to tag words in the caption as an "object" or as a "color."

At operation 1115, the system generates the color data based on the object-color pairs. In some cases, the operations of this step refer to, or may be performed by, a training component as described with reference to FIGS. 2 and 9. For example, the system may determine the color from the object-color pair, or transform the object-color pair into another representation of color data.

At operation 1120, the system performs object detection on the set of training images to obtain bounding boxes corresponding to objects in the set of training images. In some cases, the operations of this step refer to, or may be performed by, an object detection component as described with reference to FIG. 2. In some embodiments, the system defines bounding boxes according to spatial coordinates of the image. In some embodiments, the bounding boxes include metadata about the object.

At operation 1125, the system crops at least one training image of the set of training images based on the bounding boxes to obtain cropped training images, and the color classification network is trained based on the cropped training images and corresponding colors from the object-color pairs. In some cases, the operations of this step refer to, or may be performed by, an object detection component as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for color prediction, comprising:
receiving an image that includes an object comprising a color;
generating a color vector based on the image using a color classification network, wherein the color vector comprises a color value corresponding to each of a plurality of colors, and wherein the color classification network performs a convolution operation on the image to obtain the color vector;
generating a bias vector based on identifying a debiasing factor, comparing the color vector to each of a plurality of center vectors, and computing a distance function between the color vector and each of the plurality of center vectors based on the debiasing factor and the comparison, wherein each of the plurality of center vectors is generated by computing an average vector of a plurality of color feature vectors corresponding to a color of the plurality of colors; and
generating an unbiased color label for the image based on the color vector and the bias vector, wherein the unbiased color label accurately indicates the color of the object based on Classifier Sparse Encoding (CSE) for the plurality of colors by removing classifier bias and feature bias from the color vector with the bias vector.

2. The method of claim 1, further comprising:
extracting the plurality of color feature vectors corresponding to a plurality of training images from an encoder of the color classification network;
computing a plurality of average feature vectors corresponding to the plurality of colors, respectively, based on the plurality of color feature vectors; and
generating the plurality of center vectors based on the plurality of average feature vectors, respectively, using a classifier of the color classification network.

3. The method of claim 2, further comprising:
identifying a subset of the training images corresponding to each of the plurality of colors, wherein each of the plurality of average feature vectors is based on a corresponding subset of the training images.

4. The method of claim 1, further comprising:
adding the color value to a corresponding bias value from the bias vector to obtain an unbiased color value, wherein an unbiased color vector includes the unbiased color value.

5. The method of claim 4, wherein:
the unbiased color value represents a probability that the object comprises the color.

6. The method of claim 1, further comprising:
generating metadata for the image based on a unbiased color vector;
receiving a search query comprising the color; and
retrieving the image based on the search query and the metadata.

7. A non-transitory computer readable medium storing code, the code comprising instructions executable by at least one processor to perform operations comprising: receiving an image that includes an object comprising a color;

generating a color vector based on the image using a color classification network, wherein the color vector comprises a color value corresponding to each of a plurality of colors, and wherein the color classification network performs a convolution operation on the image to obtain the color vector;

generating a bias vector based on identifying a debiasing factor, comparing the color vector to each of a plurality of center vectors, and computing a distance function between the color vector and each of the plurality of center vectors based on the debiasing factor and the comparison, wherein each of the plurality of center vectors is generated by computing an average vector of a plurality of color feature vectors corresponding to a color of the plurality of colors; and generating an unbiased color label for the image based on the color vector and the bias vector, wherein the unbiased color label accurately indicates the color of the object based on Classifier Sparse Encoding (CSE) for the plurality of colors by removing classifier bias and feature bias from the color vector with the bias vector.

8. The non-transitory computer readable medium of claim 7, the code further comprising instructions executable by the at least one processor to perform operations comprising:

extracting the plurality of color feature vectors corresponding to a plurality of training images from an encoder of the color classification network;

computing a plurality of average feature vectors corresponding to the plurality of colors, respectively, based on the plurality of color feature vectors; and generating the plurality of center vectors based on the plurality of average feature vectors, respectively, using a classifier of the color classification network.

9. The non-transitory computer readable medium of claim 8, the code further comprising instructions executable by the at least one processor to perform operations comprising:

identifying a subset of the training images corresponding to each of the plurality of colors, wherein each of the plurality of average feature vectors is based on a corresponding subset of the training images.

10. The non-transitory computer readable medium of claim 7, the code further comprising instructions executable by the at least one processor to perform operations comprising:

adding the color value to a corresponding bias value from the bias vector to obtain an unbiased color value, wherein an unbiased color vector includes the unbiased color value.

11. The non-transitory computer readable medium of claim 10, wherein:

the unbiased color value represents a probability that the object comprises the color.

12. The non-transitory computer readable medium of claim 7, the code further comprising instructions executable by the at least one processor to perform operations comprising:

generating metadata for the image based on a unbiased color vector;

receiving a search query comprising the color; and retrieving the image based on the search query and the metadata.

13. An apparatus for image processing, comprising:

at least one processor;

at least one memory including instructions that, when executed by the at least one processor, cause the at least one processor to perform operations comprising:

receiving an image that includes an object comprising a color;

generating a color vector based on the image using a color classification network, wherein the color vector comprises a color value corresponding to each of a plurality of colors, and wherein the color classification network performs a convolution operation on the image to obtain the color vector;

generating a bias vector based on identifying a debiasing factor, comparing the color vector to each of a plurality of center vectors, and computing a distance function between the color vector and each of the plurality of center vectors based on the debiasing factor and the comparison, wherein each of the plurality of center vectors is generated by computing an average vector of a plurality of color feature vectors corresponding to a color of the plurality of colors; and generating an unbiased color label for the image based on the color vector and the bias vector, wherein the unbiased color label accurately indicates the color of the object based on Classifier Sparse Encoding (CSE) for the plurality of colors by removing classifier bias and feature bias from the color vector with the bias vector.

14. The apparatus of claim 13, the at least one memory further including instructions that, when executed by the at least one processor, cause the at least one processor to perform operations comprising:

extracting the plurality of color feature vectors corresponding to a plurality of training images from an encoder of the color classification network;

computing a plurality of average feature vectors corresponding to the plurality of colors, respectively, based on the plurality of color feature vectors; and generating the plurality of center vectors based on the plurality of average feature vectors, respectively, using a classifier of the color classification network.

15. The apparatus of claim 14, the at least one memory further including instructions that, when executed by the at least one processor, cause the at least one processor to perform operations comprising:

identifying a subset of the training images corresponding to each of the plurality of colors, wherein each of the plurality of average feature vectors is based on a corresponding subset of the training images.

16. The apparatus of claim 13, the at least one memory further including instructions that, when executed by the at least one processor, cause the at least one processor to perform operations comprising:

adding the color value to a corresponding bias value from the bias vector to obtain an unbiased color value, wherein a unbiased color vector includes the unbiased color value.

17. The apparatus of claim 16, wherein:

the unbiased color value represents a probability that the object comprises the color.

* * * * *